United States Patent
Wada et al.

(10) Patent No.: US 10,644,318 B2
(45) Date of Patent: May 5, 2020

(54) CARBON MATERIAL, CARBON MATERIAL-ACTIVE MATERIAL COMPOSITE, ELECTRODE MATERIAL FOR LITHIUM-ION SECONDARY BATTERY, AND LITHIUM-ION SECONDARY BATTERY

(71) Applicant: SEKISUI CHEMICAL CO., LTD., Osaka, Osaka (JP)

(72) Inventors: Takuya Wada, Osaka (JP); Hiroki Masuda, Osaka (JP); Naoki Sasagawa, Osaka (JP); Akira Nakasuga, Osaka (JP); Shoji Nozato, Osaka (JP)

(73) Assignee: SEKESUI CHEMICAL CO., LTD., Osaka (JP)

( * ) Notice: Subject to any disclaimer, the term of this patent is extended or adjusted under 35 U.S.C. 154(b) by 125 days.

(21) Appl. No.: 15/556,993

(22) PCT Filed: May 10, 2016

(86) PCT No.: PCT/JP2016/063824
§ 371 (c)(1),
(2) Date: Sep. 8, 2017

(87) PCT Pub. No.: WO2016/181952
PCT Pub. Date: Nov. 17, 2016

(65) Prior Publication Data
US 2018/0062179 A1  Mar. 1, 2018

(30) Foreign Application Priority Data

May 14, 2015 (JP) .................................. 2015-099003
Nov. 20, 2015 (JP) .................................. 2015-227494

(51) Int. Cl.
*H01M 4/62* (2006.01)
*H01M 4/131* (2010.01)
(Continued)

(52) U.S. Cl.
CPC ............. *H01M 4/625* (2013.01); *C01B 32/05* (2017.08); *C01G 51/42* (2013.01); *H01M 4/131* (2013.01);
(Continued)

(58) Field of Classification Search
CPC .. H01M 4/625; H01M 10/0525; H01M 4/525; H01M 4/622; H01M 4/364;
(Continued)

(56) References Cited

U.S. PATENT DOCUMENTS 6,316,144 B1  11/2001  Xue et al.
2003/0068556 A1  4/2003  Xue et al.
(Continued)

FOREIGN PATENT DOCUMENTS

CN  102544461 A   7/2012
EP  3 228 590 A1  10/2017
(Continued)

OTHER PUBLICATIONS

International Search Report for the Application No. PCT/JP2016/063824 dated Aug. 16, 2016.
(Continued)

*Primary Examiner* — Lisa S Park
(74) *Attorney, Agent, or Firm* — Cheng Law Group, PLLC

(57) ABSTRACT

Provided is a carbonaceous material capable of enhancing the initial charge and discharge efficiency and the cycle characteristics of lithium ion secondary batteries. The carbonaceous material is used as an electrode material for a lithium ion secondary battery and has a volume resistivity of 0.7 Ω·cm or less as measured at a pressure of 13 MPa in the form of a mixture of 5 wt % of the carbonaceous material and 95 wt % of lithium cobaltate.

22 Claims, 6 Drawing Sheets

(51) Int. Cl.
*H01M 10/0525* (2010.01)
*H01M 4/525* (2010.01)
*C01G 51/00* (2006.01)
*C01B 32/05* (2017.01)
*H01M 4/36* (2006.01)
*H01M 4/02* (2006.01)

(52) U.S. Cl.
CPC ........... *H01M 4/364* (2013.01); *H01M 4/525* (2013.01); *H01M 4/622* (2013.01); *H01M 10/0525* (2013.01); *C01P 2006/40* (2013.01); *H01M 2004/021* (2013.01); *H01M 2004/028* (2013.01)

(58) Field of Classification Search
CPC ........... H01M 4/131; H01M 2004/028; H01M 2004/021; C01B 32/05; C01G 51/42; C01P 2006/40
See application file for complete search history.

(56) References Cited

U.S. PATENT DOCUMENTS

| | | |
|---|---|---|
| 2009/0325069 A1 | 12/2009 | Anada et al. |
| 2010/0248034 A1 | 9/2010 | Oki et al. |
| 2015/0175778 A1 | 6/2015 | Nozato et al. |
| 2015/0270534 A1 | 9/2015 | Nozato et al. |
| 2015/0333320 A1 | 11/2015 | Tamaki et al. |

FOREIGN PATENT DOCUMENTS

| | | |
|---|---|---|
| JP | 8-236116 A | 9/1996 |
| JP | 2006-228468 A | 8/2006 |
| JP | 2009-176721 A | 8/2009 |
| JP | 5114857 B2 | 1/2013 |
| JP | 2014-197524 A | 10/2014 |
| JP | 5636135 B1 | 12/2014 |
| TW | 201442953 A | 11/2014 |
| WO | WO-2008/029502 A1 | 3/2008 |
| WO | WO-2014/034156 A1 | 3/2014 |
| WO | WO-2014/115669 A1 | 7/2014 |

OTHER PUBLICATIONS

Written Opinion of the International Searching Authority (PCT/ISA/237) for Application No. PCT/JP2016/063824 dated Aug. 16, 2016.
Written Opinion of the International Searching Authority (PCT/ISA/237) for Application No. PCT/JP2016/063824 dated Aug. 16, 2016 (English Translation mailed Nov. 23, 2017).
Wopenka, B. et al., "Murchison presolar carbon grains of different density fractions: A Raman spectroscopic perspective", Geochimca et Cosmochimica Acta, 2013, vol. 106, pp. 463-489.
Supplementary European Search Report for the Application No. EP 16 792 677.3 dated Nov. 21, 2018.
European Office Action for Application No. 16 792 677.3 dated Nov. 7, 2019.
Taiwanese Office Action for Application No. 105114983 dated Nov. 12, 2019.
Notification of Reasons for Refusal for the Application No. 2017-156502 from Japan Patent Office dated Jan. 28, 2020.

[FIG. 1]
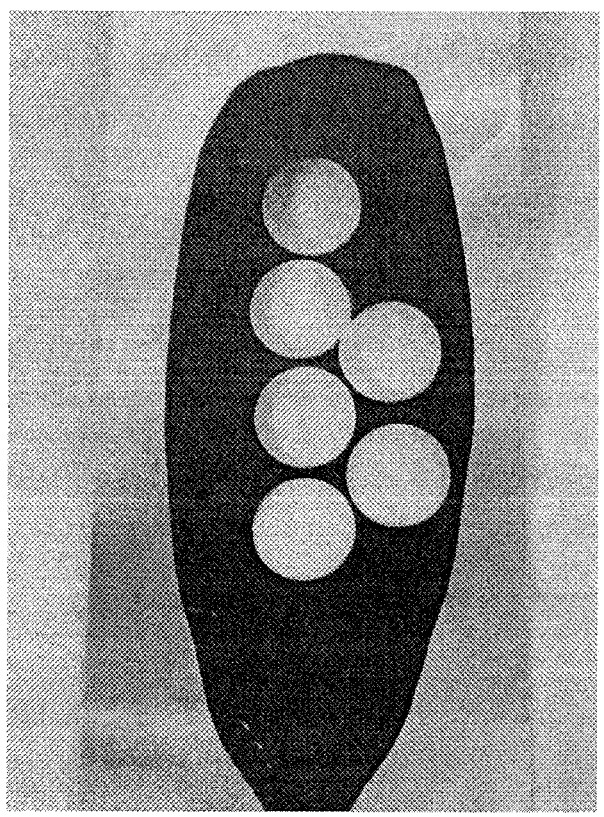

[FIG. 2]
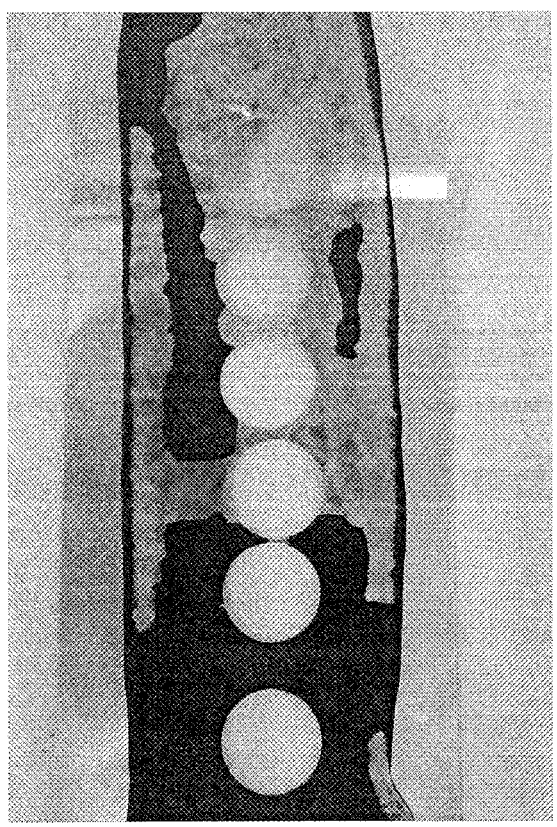

[FIG. 3]
[FIG. 4]
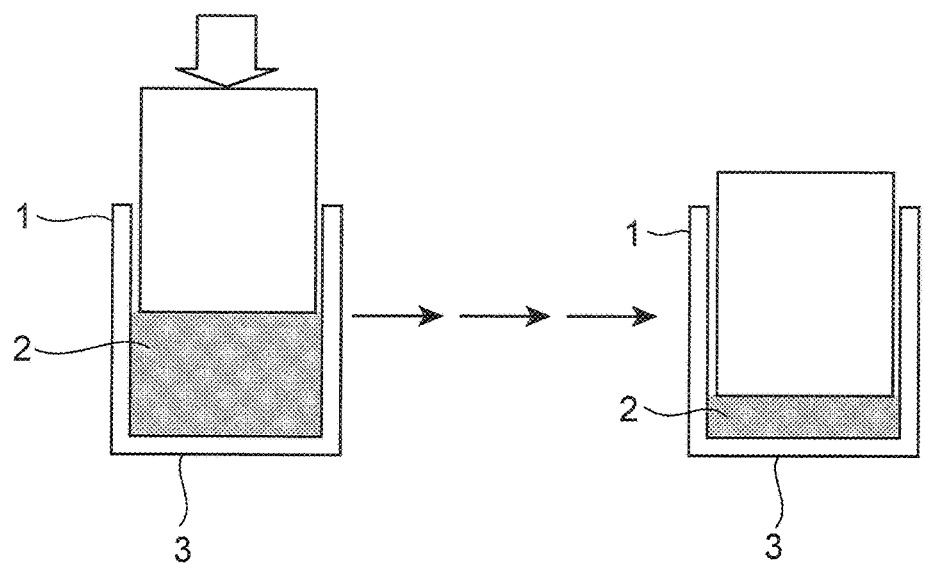

[FIG. 5]
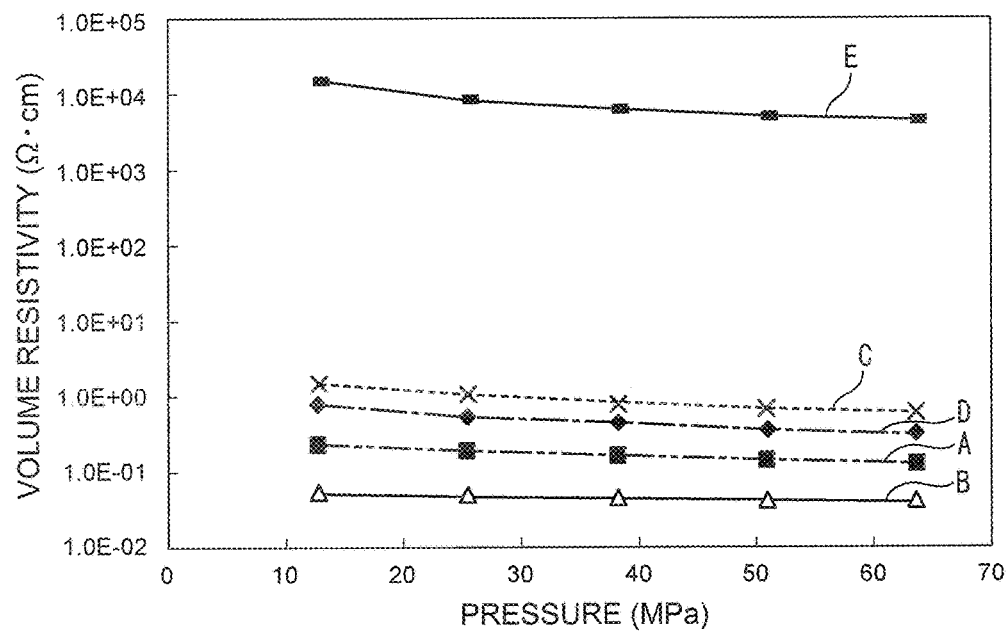
[FIG. 6]
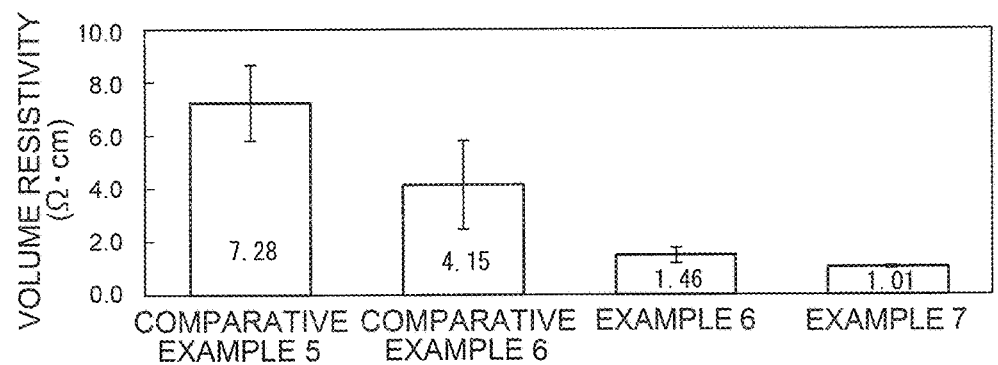
[FIG. 7]
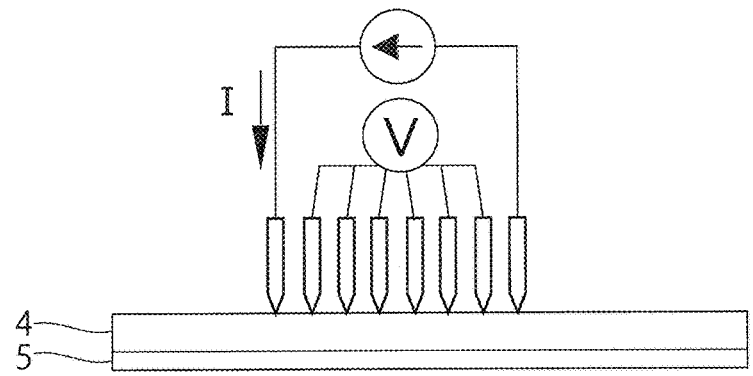

[FIG. 8]
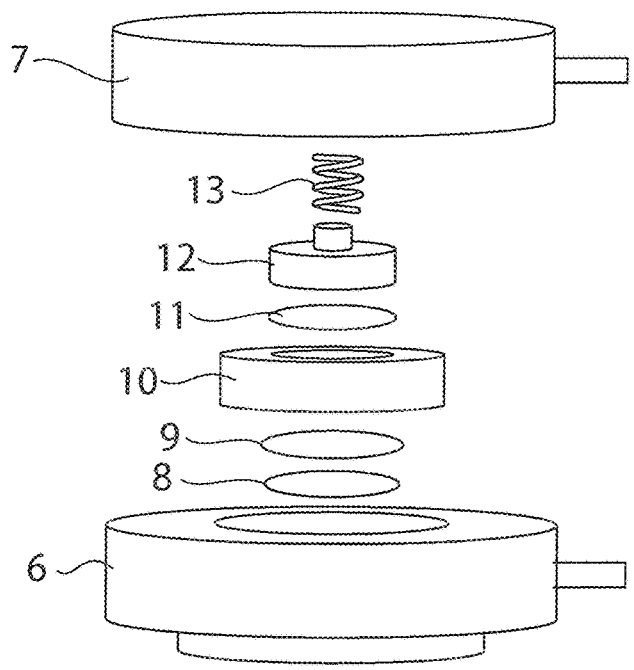
[FIG. 9]
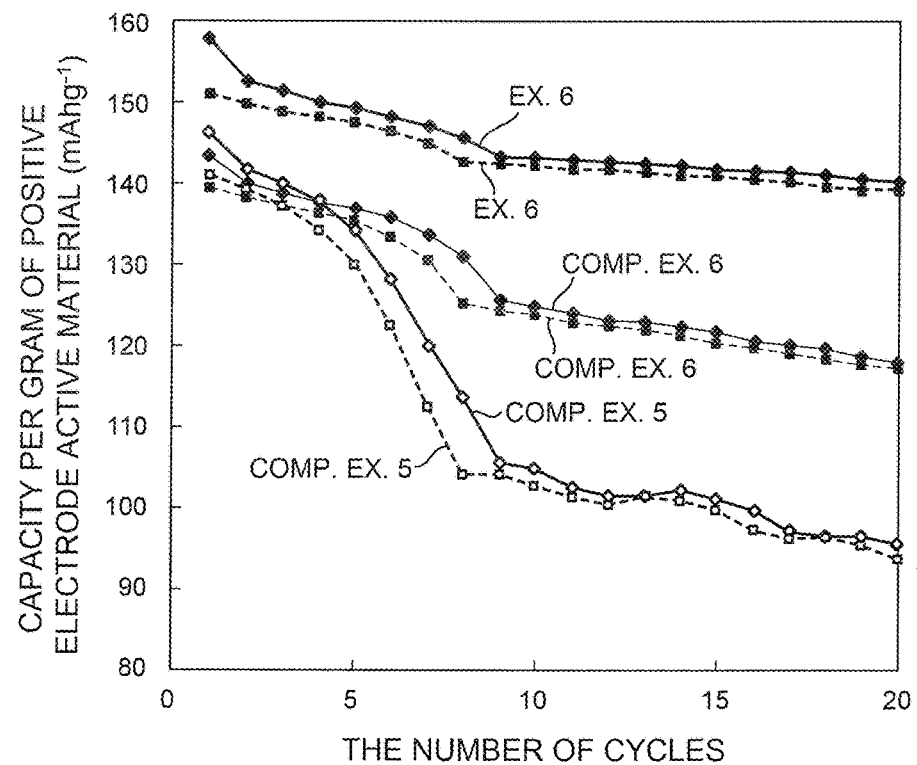

[FIG. 10]
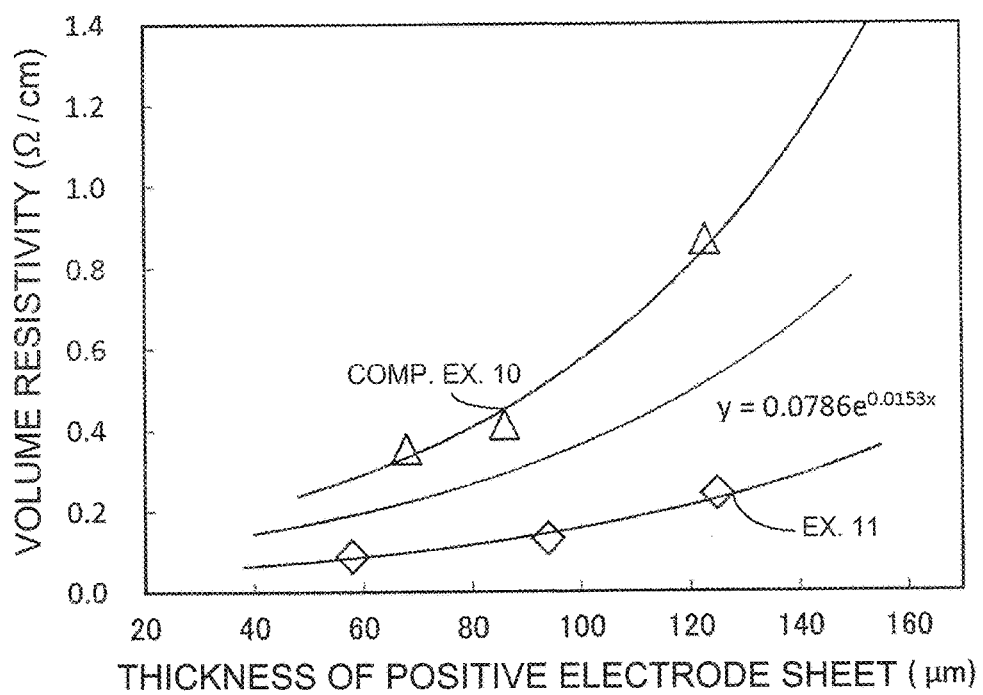

CARBON MATERIAL, CARBON MATERIAL-ACTIVE MATERIAL COMPOSITE, ELECTRODE MATERIAL FOR LITHIUM-ION SECONDARY BATTERY, AND LITHIUM-ION SECONDARY BATTERY

TECHNICAL FIELD

The present invention relates to a carbonaceous material, a carbonaceous material-active material complex, an electrode material for a lithium ion secondary battery, and a lithium ion secondary battery.

BACKGROUND ART

Conventionally, lithium ion secondary batteries are widely used since a size reduction and a capacity increase can be achieved. In such lithium ion secondary batteries, carbonaceous materials are widely used as electrode materials constituting a positive electrode and a negative electrode. For example, in Patent Literature 1 below, a complex of a positive electrode active material and graphene is disclosed as an electrode material of a positive electrode. In Patent Literatures 2 and 3 below, a complex of fine particles and partially exfoliated graphite is disclosed as an electrode material of a negative electrode.

CITATION LIST

Patent Literature

Patent Literature 1: International Publication No. WO 2014/115669 A1
Patent Literature 2: Japanese Patent No. 5636135
Patent Literature 3: Japanese Patent Laid-Open No. 2014-197524

SUMMARY OF INVENTION

Technical Problems

In a positive electrode material for a lithium ion secondary battery, a conduction aid is used in order to compensate for the conductivity of an active material. Such a conduction aid is mixed with the active material and a binder resin and is applied to a current collector for use. Since the electrode density needs to be increased in use for a positive electrode, the conduction aid is generally used after being processed by roll pressing.

However, in the case of using graphene as the conduction aid as in Patent Literature 1, such processing by roll pressing may cause separation of the active material from the current collector in some cases. Such separation occurs particularly significantly when the amount of the binder resin added is small. Therefore, the amount of the binder resin added needs to be large, and therefore it has been difficult to increase the electrode density, which is necessary for a positive electrode.

In the case of using graphene as the conduction aid as in Patent Literature 1, the initial charge and discharge efficiency and the cycle characteristics of the lithium ion secondary battery are insufficient.

Patent Literatures 2 and 3 disclose the use of partially exfoliated graphite for an electrode for a lithium ion secondary battery. However, the use and effect are merely described for application to a negative electrode material.

It is an object of the present invention to provide a carbonaceous material, a carbonaceous material-active material complex, and an electrode material for a lithium ion secondary battery, which can enhance the initial charge and discharge efficiency and the cycle characteristics of lithium ion secondary batteries, and a lithium ion secondary battery including an electrode constituted by the carbonaceous material-active material complex or the electrode material for a lithium ion secondary battery.

Solution to Problems

The carbonaceous material according to the present invention is a carbonaceous material used as an electrode material for a lithium ion secondary battery and has a volume resistivity of 0.7 $\Omega \cdot cm$ or less as measured at a pressure of 13 MPa in the form of a mixture of 5 wt % of the carbonaceous material and 95 wt % of lithium cobaltate.

In a specific aspect, the carbonaceous material according to the present invention has a volume resistivity of 0.5 $\Omega \cdot cm$ or less as measured at a pressure of 13 MPa in the form of a mixture of 5 wt % of the carbonaceous material and 95 wt % of lithium cobaltate.

In another specific aspect, the carbonaceous material according to the present invention has a volume resistivity of 0.4 $\Omega \cdot cm$ or less as measured at a pressure of 38 MPa in the form of a mixture of 5 wt % of the carbonaceous material and 95 wt % of lithium cobaltate.

In still another specific aspect, the carbonaceous material according to the present invention has a volume resistivity of 0.04 $\Omega \cdot cm$ or less as measured at a pressure of 38 MPa in the form of a mixture of 3 wt % of the carbonaceous material and 97 wt % of lithium cobaltate.

In still another specific aspect, the carbonaceous material according to the present invention has a volume resistivity of 0.1 $\Omega \cdot cm$ or less as measured at a pressure of 38 MPa in the form of a mixture of 2 wt % of the carbonaceous material and 98 wt % of lithium cobaltate.

In still another specific aspect, the carbonaceous material according to the present invention has a volume resistivity of 5.5 $\Omega \cdot cm$ or less as measured at a pressure of 38 MPa in the form of a mixture of 1 wt % of the carbonaceous material and 99 wt % of lithium cobaltate.

In still another specific aspect, the carbonaceous material according to the present invention has a D/G ratio of 0.5 or less when a peak intensity ratio between the D band and the G band is referred to as the D/G ratio in a Raman spectrum obtained by Raman spectroscopy.

In still another specific aspect, the carbonaceous material according to the present invention satisfies $y<0.1055e^{0.0169x}$ ($x \geq 60$) when a thickness of a sheet consisting of 5 wt % of the carbonaceous material, 92 wt % of lithium cobaltate, and 3 wt % of polyvinylidene fluoride is referred to as x μm, and a volume resistivity of the sheet is referred to as y $\Omega \cdot cm$.

In still another specific aspect, the carbonaceous material according to the present invention has a BET specific surface area ($m^2/g$) of 25 $m^2/g$ or more and 500 $m^2/g$ or less.

In still another specific aspect, the carbonaceous material according to the present invention is obtained by pyrolysis of a resin in a composition in which the resin is grafted or fixed by adsorption onto graphite or primary exfoliated graphite, and has a structure in which the graphite is partially exfoliated.

The carbonaceous material-active material complex according to the present invention includes the carbonaceous material configured according to the present invention and an active material.

In the carbonaceous material-active material complex according to the present invention, the active material is preferably lithium cobaltate.

In the carbonaceous material-active material complex according to the present invention, a content of the carbonaceous material is preferably 0.5 wt % or more and 10 wt % or less.

The carbonaceous material-active material complex according to the present invention is preferably a positive electrode material for a lithium ion secondary battery.

In a broad aspect, the lithium ion secondary battery according to the present invention includes an electrode constituted by the carbonaceous material-active material complex configured according to the present invention.

The electrode material for a lithium ion secondary battery according to the present invention is an electrode material for a lithium ion secondary battery, and includes: an active material; a conduction aid containing a carbonaceous material; and a binder resin, wherein a percentage of the conduction aid in 100 wt % of the electrode material is 1 wt % or more and 10 wt % or less, a percentage of the binder resin in 100 wt % of the electrode material is 1 wt % or more and 4 wt % or less, and when an amount of methylene blue adsorbed per gram of the carbonaceous material (μmol/g) is referred to y, the amount of methylene blue adsorbed being measured based on a difference between an absorbance of a methanol solution of methylene blue at a concentration of 10 mg/L and an absorbance of a supernatant obtained by placing the carbonaceous material in the methanol solution of methylene blue, followed by centrifugation, and a BET specific surface area ($m^2/g$) of the carbonaceous material is referred to as x, a ratio y/x is 0.14 or more, and the BET specific surface area of the carbonaceous material is 25 $m^2/g$ or more and 500 $m^2/g$ or less.

In a specific aspect of the electrode material for a lithium ion secondary battery according to the present invention, the carbonaceous material is obtained by pyrolysis of a resin in a composition in which the resin is grafted or fixed by adsorption onto graphite or primary exfoliated graphite, has a structure in which the graphite is partially exfoliated, and is a resin-remaining partially exfoliated graphite in which the resin partially remains.

In another specific aspect of the electrode material for a lithium ion secondary battery according to the present invention, an electrode density is 0.8 times or more and 1.5 times or less (1.6 to 3.9 $g/cm^3$ as an electrode density) with respect to a specific gravity of the active material (in the case of $LiCoO_2$, a specific gravity of 2.0 to 2.6 $g/cm^3$).

In still another specific aspect of the electrode material for a lithium ion secondary battery according to the present invention, the active material is lithium cobaltate.

In still another specific aspect of the electrode material for a lithium ion secondary battery according to the present invention, the binder resin includes at least one selected from the group consisting of styrene butadiene rubber, carboxymethylcellulose, polyvinylidene fluoride, polyimide resin, acrylic resin, butyral resin, and modified products thereof.

In still another specific aspect, the electrode material for a lithium ion secondary battery according to the present invention is a positive electrode material for a lithium ion secondary battery.

In another broad aspect, the lithium ion secondary battery according to the present invention includes an electrode constituted by the electrode material for a lithium ion secondary battery configured according to the present invention.

Advantageous Effects of Invention

According to the present invention, a carbonaceous material, a carbonaceous material-active material complex, and an electrode material for a lithium ion secondary battery, which can enhance the initial charge and discharge efficiency and the cycle characteristics of lithium ion secondary batteries, can be provided.

According to the present invention, a lithium ion secondary battery having excellent initial charge and discharge efficiency and excellent cycle characteristics can be further provided.

BRIEF DESCRIPTION OF DRAWINGS

FIG. 1 is an image of a positive electrode for a lithium ion secondary battery obtained in Example 1.

FIG. 2 is an image of a positive electrode for a lithium ion secondary battery obtained in Comparative Example 1.

FIG. 3 is an image of a positive electrode for a lithium ion secondary battery obtained in Comparative Example 2.

FIG. 4 is a schematic diagram for explaining a method for measuring the volume resistivity.

FIG. 5 is a graph showing the volume resistivity at each pressure of carbonaceous material-active material complexes obtained in Examples and Comparative Examples.

FIG. 6 is a graph showing the volume resistivity of electrode sheets after roll pressing obtained in Examples and Comparative Examples.

FIG. 7 is a schematic diagram for explaining a method for measuring the volume resistivity of the electrode sheets.

FIG. 8 is an exploded perspective view showing a schematic configuration of an experimental battery of the lithium ion secondary batteries produced in Examples and Comparative Examples.

FIG. 9 is a graph showing the charge and discharge characteristics of the lithium ion secondary batteries produced using the positive electrodes obtained in Examples and Comparative Examples.

FIG. 10 is a relationship graph showing the thickness of the positive electrode sheets of Example 11 and Comparative Example 10 on the horizontal axis and the volume resistivity of the positive electrode sheets thereof on the vertical axis.

DESCRIPTION OF EMBODIMENTS

Hereinafter, the present invention will be described in detail.

(Carbonaceous Material)

The carbonaceous material of the present invention is a carbonaceous material used as an electrode material for a lithium ion secondary battery. The carbonaceous material of the present invention has a volume resistivity of 0.7 Ω·cm or less as measured at a pressure of 13 MPa in the form of a mixture of 5 wt % of the carbonaceous material and 95 wt % of lithium cobaltate.

Hereinafter, a method for measuring the volume resistivity will be described with reference to FIG. 4.

First, as shown in FIG. 4, 1.0 g of a sample 2 is filled into a case 1 including an electrode 3. Next, the electric resistance value of the sample 2 when compressed at a predetermined pressure is measured by the four-probe method via the electrode 3. Thus, the volume resistivity at each pressure can be measured. Such measurement of the volume resistivity can be performed, for example, using a powder resistivity meter (product number: PD-51, manufactured by Mitsubishi Chemical Corporation).

As a result of diligent studies, the inventors of the subject application have found that, when a carbonaceous material having a volume resistivity measured as above within a specific range is used as an electrode material for a lithium ion secondary battery, the initial efficiency of charging and discharging the lithium ion secondary battery is improved, and excellent cycle characteristics are obtained.

For example, when the carbonaceous material of the present invention is used as a conduction aid for an electrode material for a lithium ion secondary battery, the initial charge and discharge efficiency and the cycle characteristics of lithium ion secondary battery can be enhanced, and therefore the carbonaceous material of the present invention can be used suitably as a positive electrode material for a lithium ion secondary battery.

In order to further enhance the initial charge and discharge efficiency and the cycle characteristics of the lithium ion secondary battery, the carbonaceous material of the present invention preferably has a volume resistivity of 0.7 Ω·cm or less, more preferably 0.5 Ω·cm or less, further preferably 0.4 Ω·cm or less, particularly preferably 0.3 Ω·cm or less, as measured at a pressure of 13 MPa in the form of a mixture of 5 wt % of the carbonaceous material and 95 wt % of lithium cobaltate. The volume resistivity as measured at a pressure of 38 MPa is preferably 0.4 Ω·cm or less, more preferably 0.2 Ω·cm or less.

In the present invention, the volume resistivity as measured at a pressure of 38 MPa in the form of a mixture of 3 wt % of the carbonaceous material and 97 wt % of the lithium cobaltate is preferably 0.04 Ω·cm or less. In this case, the proportion of lithium cobaltate is increased, and therefore the capacity can be still further enhanced.

For still further enhancing the capacity, the volume resistivity as measured at a pressure of 38 MPa in the form of a mixture of 2 wt % of the carbonaceous material and 98 wt % of the lithium cobaltate is preferably 0.1 Ω·cm or less.

For still further enhancing the capacity, the volume resistivity as measured at a pressure of 38 MPa in the form of a mixture of 1 wt % of the carbonaceous material and 99 wt % of the lithium cobaltate is preferably 5.5 Ω·cm or less.

The carbonaceous material preferably has a D/G ratio of 0.5 or less when the peak intensity ratio between the D band and the G band is referred to as the D/G ratio in the Raman spectrum obtained by Raman spectroscopy. In this case, the initial charge and discharge efficiency and the cycle characteristics of the lithium ion secondary battery can be still further enhanced.

In the present invention, $y < 0.1055 e^{0.0169x}$ ($x \geq 60$) is preferably satisfied, when the thickness of a sheet consisting of 5 wt % of the carbonaceous material, 92 wt % of lithium cobaltate, and 3 parts by weight of polyvinylidene fluoride is referred to as x μm, and the volume resistivity of the sheet is referred to as y Ω·cm. In this case, even if the thickness of the sheet is increased, the volume resistivity is still further reduced, and therefore the thickness of the sheet can be still further increased. Therefore, the capacity can be still further enhanced.

For still further enhancing the capacity, the x and the y more preferably satisfy $y \leq 0.0786 e^{0.0153x}$ ($x \geq 60$), further preferably satisfy $y \leq 0.0355 e^{0.0149x}$.

The carbonaceous material of the present invention preferably has a graphene-layered structure. It is desirable to have an exfoliated flat plate shape.

In the case of using a carbonaceous material having an exfoliated flat plate shape for the conduction aid, the contact point with the active material can be still further enhanced. Therefore, the initial charge and discharge efficiency and the cycle characteristics of the lithium ion secondary battery can be still further enhanced.

Examples of such a carbonaceous material include a partially exfoliated graphite. The partially exfoliated graphite contains graphite or primary exfoliated graphite and a resin and is obtained by preparing a composition in which the resin is grafted or fixed by adsorption onto the graphite or the primary exfoliated graphite, followed by pyrolysis. The resin contained in the composition is desirably removed but may partially remain.

The distance between graphite layers in the graphite or the primary exfoliated graphite is increased by the pyrolysis. Accordingly, the partially exfoliated graphite has a structure in which the graphite interlaminar distance is enhanced, from edge to the inside to some extent, that is, the graphite is partially exfoliated, and the graphite layers are laminated in the part on the center side in the same manner as in the original graphite or the primary exfoliated graphite.

The partially exfoliated graphite is formed by the graphite in the edge parts of the graphite or the primary exfoliated graphite being exfoliated and partially exfoliated. The graphite in the edge parts is graphene layered portions in the edge parts of the graphite or the primary exfoliated graphite.

The graphite is a laminate of a plurality of graphene layers. As the graphite, natural graphite, artificial graphite, expanded graphite, or the like can be used. The distance between graphene layers is larger in expanded graphite than in usual graphite. Accordingly, the exfoliation is easy. Therefore, in the case of using expanded graphite, the exfoliated graphite can be obtained more easily.

The number of laminated graphene layers in the graphite is about 100,000 layers or more to 1,000,000 layers, and the graphite has a specific surface area by BET (BET specific surface area) of less than 25 m$^2$/g.

Meanwhile, in the partially exfoliated graphite, the number of laminated graphene layers is small in the portions where the graphite is partially exfoliated. The number of laminated graphene layers is preferably 1,000 layers or less, more preferably 100 layers or less, further preferably 20 layers or less, in the exfoliated portions. When the number of laminated graphene layers is small in the exfoliated portions, the initial charge and discharge efficiency and the cycle characteristics of the lithium ion secondary battery can be still further enhanced.

In the partially exfoliated graphite, the number of laminated graphene layers is small in the exfoliated portions in the edge parts, and therefore the partially exfoliated graphite has a larger specific surface area by BET (BET specific surface area) than the graphite. The BET specific surface area of the partially exfoliated graphite is preferably 25 m$^2$/g or more and 500 m$^2$/g or less. When the BET specific surface area falls within the aforementioned range, the contact point with the active material when used for the conduction aid can be still further enhanced, and therefore the initial charge and discharge efficiency and the cycle characteristics of the lithium ion secondary battery can be still further enhanced.

In the present invention, primary exfoliated graphite may be used as a raw material instead of the graphite. The primary exfoliated graphite contains a large amount of an exfoliated graphite obtained by exfoliating graphite. In the case of using the primary exfoliated graphite as a raw material, a composition which contains the primary exfoliated graphite and a resin and in which the resin is grafted or adsorbed onto the primary exfoliated graphite is prepared. Since the primary exfoliated graphite is obtained by exfoliating graphite, the primary exfoliated graphite may have a larger specific surface area than the graphite.

In this description, the exfoliated graphite means a graphene laminate after exfoliation which is obtained by exfoliating the original graphite or the primary exfoliated graphite and which has a larger specific surface area than the original graphite or the primary exfoliated graphite or has a decomposition end point of the original graphite or the primary exfoliated graphite shifted to a low temperature.

As described above, the partially exfoliated graphite has a graphite structure at the center part and has an exfoliated structure in the edge parts. Therefore, the handling thereof is easier than in a conventional exfoliated graphite.

The partially exfoliated graphite can be obtained by producing a resin-remaining partially exfoliated graphite by the same method as the method for producing an exfoliated graphite-resin composite material according to International Publication No. WO 2014/034156 A1 and removing excess resin by heating. The removal of the resin may be omitted in use, but the use after removing the resin is preferable.

Since the partially exfoliated graphite obtained by the aforementioned production method undergoes no oxidation step, it has superior conductivity to conventional graphene oxide and graphene obtained by reducing the graphene oxide. This is probably because the $sp^2$ structure cannot be sufficiently secured in the conventional graphene oxide or the redox graphene. Since the partially exfoliated graphite has superior conductivity to the conventional graphene oxide or the redox graphene, the initial charge and discharge efficiency and the cycle characteristics of the lithium ion secondary battery can be still further enhanced.

(Carbonaceous Material-Active Material Complex)

The carbonaceous material-active material complex of the present invention contains the carbonaceous material and an active material. The active material is not specifically limited, but a material that acts as a positive electrode for a lithium ion secondary battery can be suitably used. Examples of such a material that can be used include layered oxide active materials such as lithium cobaltate ($LiCoO_2$), lithium-rich active materials, spinel-type positive electrode active materials such as lithium manganate ($LiMn_2O_4$), metal oxide active materials such as $V_2O_5$, metal compound active materials such as $TiS_2$, $MoS_2$, and $NbSe_2$, or olivine active materials such as lithium iron phosphate and lithium manganese phosphate. Preferably, layered oxide active materials such as lithium cobaltate ($LiCoO_2$) are used. These may be individually used, or a plurality of them may be used in combination.

The content of the carbonaceous material in the carbonaceous material-active material complex is preferably 0.5 wt % or more, more preferably 10 wt % or less. When the content of the carbonaceous material is 0.5 wt % or more, the initial charge and discharge efficiency and the cycle characteristics of the lithium ion secondary battery can be enhanced more effectively. When the content of the carbonaceous material is 10 wt % or less, the content of the active material is increased, and thus the charge-discharge capacity as a battery can be still further increased.

The method for producing the carbonaceous material-active material complex is not specifically limited, but the following method, for example, can be used for the production.

First, in the case of using the partially exfoliated graphite for the carbonaceous material, a resin-remaining partially exfoliated graphite is obtained by the same method as the method for producing an exfoliated graphite-resin composite material according to International Publication No. WO 2014/034156 A1.

Next, the resin-remaining partially exfoliated graphite and the active material are dispersed in a solvent for adsorption, followed by stirring for a predetermined time, so that the active material and the carbonaceous material are adsorbed together in the solvent. Next, the solvent is removed, and the complex of the active material and the conduction aid is dried, followed by calcination of the complex, so that the remaining resin is removed. Thereby, a carbonaceous material-active material complex is obtained.

As the solvent for adsorption, at least one selected from nonpolar solvents such as hexane, toluene, and ethyl acetate, polar aprotic solvents such as tetrahydrofuran (THF) and N,N-dimethylformamide, and polar protic solvents such as methanol and ethanol can be used. Preferably, tetrahydrofuran can be used. In the case of using tetrahydrofuran, the carbonaceous material and the active material are adsorbed together more strongly, and thus the powder resistance of the carbonaceous material-active material complex and the electrode resistance of an electrode produced using the complex can be still further reduced.

The carbonaceous material-active material complex of the present invention contains the carbonaceous material having a volume resistivity within the aforementioned range, and therefore when it is used as an electrode material for a lithium ion secondary battery, the initial charge and discharge efficiency and the cycle characteristics of the lithium ion secondary battery can be effectively enhanced.

Accordingly, the carbonaceous material-active material complex of the present invention can be suitably used as an electrode material for a lithium ion secondary battery. In particular, it can be suitably used as a positive electrode material for a lithium ion secondary battery.

(Electrode Material for a Lithium Ion Secondary Battery)

The electrode material for a lithium ion secondary battery according to the present invention is an electrode material for a lithium ion secondary battery. The electrode material for a lithium ion secondary battery according to the present invention contains an active material, a conduction aid, and a binder resin. The conduction aid contains a carbonaceous material.

The content of the conduction aid in 100 wt % of the electrode material is 1 wt % or more and 10 wt % or less. When the content of the conduction aid is excessively low, the conductive path with the current collector is reduced, which may result in failure to obtain a sufficient conductivity in some cases. On the other hand, when the content of the conduction aid is excessively high, the active material may be separated from the current collector, as will be described below.

For further enhancing the conductivity and further suppressing the separation of the active material from the current collector, the content of the conduction aid in 100 wt % of the electrode material is preferably 1 wt % or more and 10 wt % or less, more preferably 5 wt % or less, further preferably 3 wt % or less.

The content of the binder resin in 100 wt % of the electrode material is 1 wt % or more and 4 wt % or less. When the content of the binder resin is excessively low, the active material may be separated from the current collector, as will be described below. On the other hand, when the content of the binder resin is excessively high, the electrode density may not be able to be sufficiently increased in some cases.

For still further suppressing the separation of the active material from the current collector and still further enhancing the electrode density, the content of the binder resin in 100 wt % of the electrode material is preferably 1 wt % or more, more preferably 2 wt % or more, and preferably 4 wt % or less, more preferably 3 wt % or less.

In the present invention, when an amount of methylene blue adsorbed per gram of the carbonaceous material (μmol/g) is referred to y, the amount of methylene blue adsorbed being measured based on the difference between the absorbance of a methanol solution of methylene blue at a concentration of 10 mg/L and the absorbance of a supernatant obtained by placing the carbonaceous material in the methanol solution of methylene blue, followed by centrifugation, and the BET specific surface area ($m^2/g$) of the carbonaceous material is referred to as x, the ratio y/x is 0.14 or more, and the BET specific surface area of the carbonaceous material is 25 $m^2/g$ or more and 500 $m^2/g$ or less.

In the present invention, since the ratio y/x is 0.14 or more, the specific surface area of the carbonaceous material in liquid is large. Therefore, the contact area between the carbonaceous material and the active material can be increased in the solvent.

In the present invention, the BET specific surface area falls within the aforementioned range, and therefore the distance between graphene layers is shortened in a dry state, and the specific surface area of the carbonaceous material is reduced. Therefore, in the step of adding the binder after the complex of the carbonaceous material and the active material is dried, the amount of the binder resin adsorbed onto the surface of the carbonaceous material can be reduced, as a result of which the amount of the binder adsorbed onto the surface of the current collector can be increased. Accordingly, the separation of the active material from the current collector is suppressed. A more specific description will be given as follows.

An electrode material for a lithium ion secondary battery is generally used by being applied to a current collector such as a metal foil. At this time, the electrode density is required to be increased, particularly, in a positive electrode, and therefore the electrode material is used by being further processed by roll pressing.

Note that, in the case of using a conduction aid having a large BET specific surface area such as graphene, CNT, and spherical carbon, although the contact area between the active material and the conduction aid can be ensured, the amount of the binder adsorbed onto the surface of the conduction aid is increased at the same time. Eventually, the amount of the binder resin adsorbed onto the surface of the current collector is decreased. Therefore, when the amount of the binder resin added is small, the amount of the binder resin that is used for improving the adhesion of the active material or the complex of the active material and the conduction aid to the current collector is insufficient, which may cause the separation of the active material from the current collector during compression by roll pressing in some cases. On the other hand, in the case of using a conduction aid having a small BET specific surface area such as graphite, the contact area between the conduction aid and the active material cannot be ensured, and the number of laminated graphene layers is also increased, as a result of which a uniform electrode film cannot be applied in application of the electrode film, and use as an electrode is impossible.

In contrast, the conduction aid having a large specific surface area in liquid and a small specific surface area in a dry state is used in the present invention. Therefore, the contact area between the conduction aid and the active material can be ensured by mixing the conduction aid and the active material together in liquid, and the adhesion can be enhanced. The amount of the binder adsorbed onto the surface of the conduction aid can be reduced by mixing the complex of the conduction aid and the active material with the binder resin in a dry state, and eventually the amount of the binder resin adsorbed onto the surface of the current collector is increased. Therefore, even if the amount of the binder resin added is small, the amount of the binder resin used for improving the adhesion between the active material and the current collector can be ensured, and the separation from the current collector is suppressed.

In this way, the carbonaceous material used in the present invention has a reduced specific surface area in a dry state as compared with that in liquid. Accordingly, as being different from a conduction aid having almost constant specific surface area in liquid and in a dry state such as graphene, CNT, graphite, and spherical carbon, the separation of the active material from the current collector can be suppressed, even if the amount of the binder resin added is small.

Thus, the separation of the active material from the current collector is less likely to occur in the electrode material for a lithium ion secondary battery according to the present invention, even if the amount of the binder resin added is small. The amount of the binder resin added can be reduced, and therefore the electrode density can be enhanced. Accordingly, in the case of using the electrode material for a lithium ion secondary battery according to the present invention as an electrode material of a positive electrode, the capacity of the lithium ion secondary battery can be enhanced. For still further increasing the capacity of the lithium ion secondary battery, the electrode density is preferably 0.8 times or more and 1.5 times or less (in the case where the active material is $LiCoO_2$, the electrode density is 1.6 to 3.9 $g/cm^3$) with respect to the specific gravity of the active material (in the case of $LiCoO_2$, 2.0 to 2.6 $g/cm^3$).

Hereinafter, the materials constituting the electrode material for a lithium ion secondary battery according to the present invention will be described further in detail.

Active Material:

The active material is not specifically limited, and a material that acts as a positive electrode in a lithium ion secondary battery can be suitably used therefor. Examples of such a material that can be used include layered oxide active materials such as lithium cobaltate ($LiCoO_2$), lithium-rich active materials, spinel-type positive electrode active materials such as lithium manganate ($LiMn_2O_4$), metal oxide active materials such as $V_2O_5$, metal compound active materials such as $TiS_2$, $MoS_2$, and $NbSe_2$, or olivine active materials such as lithium iron phosphate and lithium manganese phosphate. These may be individually used, or a plurality of them may be used in combination.

Conduction Aid:

The conduction aid contains a carbonaceous material. The carbonaceous material preferably has a graphene-layered structure.

In the carbonaceous material, when an amount of methylene blue adsorbed (μmol/g) measured by the following method is referred to as y, and the BET specific surface area ($m^2/g$) is referred to as x, the ratio y/x is preferably 0.14 or more, and the BET specific surface area is preferably 25 $m^2/g$ or more and 500 $m^2/g$ or less. The ratio y/x is preferably 0.14 or more and 1.00 or less. The BET specific surface area is more preferably 50 m²/g or more and 300 m²/g or less, further preferably 280 m²/g or less.

The amount of methylene blue adsorbed is measured based on the difference between the absorbance of a methanol solution of methylene blue at a concentration of 10 mg/L and the absorbance of a supernatant obtained by placing the carbonaceous material in the methanol solution of methylene blue, followed by stirring and centrifugation.

More specifically, the amount of methylene blue adsorbed is determined by the following method. The carbonaceous material is placed in the methanol solution of methylene blue at a concentration of 10 mg/L, followed by stirring. After subsequent centrifugation, a change in absorbance of the resultant supernatant at the maximum absorption wavelength is observed. Methylene blue is adsorbed by π conjugation onto the portion where the graphene of the carbonaceous material is layered. Meanwhile, methylene blue emits fluorescence by irradiation with light. When methylene blue is adsorbed onto the graphene, it does not emit fluorescence any more. That is, the fluorescence intensity decreases. Therefore, the amount of methylene blue adsorbed can be determined by the decrease in the fluorescence intensity of the supernatant from the fluorescence intensity of the original methylene blue.

Meanwhile, there is a correlation between the amount of methylene blue adsorbed and the specific surface area of the carbonaceous material. In conventionally known spherical graphite particles, when the specific surface area determined by BET (m²/g) is referred to as x, and the amount of methylene blue adsorbed (μmol/g) is referred to as y, there is a relationship of y≈0.13x. This indicates that the amount of methylene blue adsorbed increases as the specific surface area increases. Accordingly, the amount of methylene blue adsorbed can be an indicator instead of the specific surface area.

In the present invention, the ratio y/x of the carbonaceous material is preferably 0.14 or more, as described above. In contrast, in the conventional spherical graphite particles, the ratio y/x is 0.13. Accordingly, when the ratio y/x is 0.14 or more, the amount of methylene blue adsorbed is larger than in the conventional spherical graphite, while the BET specific surface area is the same. That is, in this case, the gap between graphene layers or between graphite layers can be still further widened in a wet state such as in methanol as compared with in a dry state, though it is compressed in a dry state to some extent.

Examples of such a carbonaceous material include a resin-remaining partially exfoliated graphite.

The resin-remaining partially exfoliated graphite contains graphite or primary exfoliated graphite and a resin, and is obtained by preparing a composition in which the resin is grafted or fixed by adsorption onto the graphite or the primary exfoliated graphite, followed by pyrolysis, while the resin contained in the composition partially remains therein.

The distance between the graphite layers in the graphite or the primary exfoliated graphite is increased by the pyrolysis. Accordingly, the resin-remaining partially exfoliated graphite has a structure in which the graphite interlaminar distance is enhanced, from edge to the inside to some extent, that is, the graphite is partially exfoliated, and the graphite layers are laminated in the part on the center side in the same manner as in the original graphite or the primary exfoliated graphite. The resin-remaining partially exfoliated graphite is formed by the graphite in the edge parts of the graphite or the primary exfoliated graphite being exfoliated and partially exfoliated. The graphite in the edge parts is graphene layered portions in the edge parts of the graphite or the primary exfoliated graphite.

In the present invention, the pyrolysis is performed with the resin partially remaining, and therefore the resin grafted or fixed by adsorption onto the graphite or the primary exfoliated graphite partially remains. Accordingly, particularly in liquid, the specific surface area increases more significantly than the specific surface area of the original graphite. Since the resin partially remains, the dispersibility in the binder is improved, so that the amount of the binder can be reduced. Moreover, since the remaining resin is contained, the scattering is less likely occur, and the handling is easy, despite large specific surface area.

The graphite is a laminate of a plurality of graphene layers. As the graphite, natural graphite, artificial graphite, expanded graphite, or the like can be used. The distance between graphene layers is larger in expanded graphite than in usual graphite. Accordingly, the exfoliation is easy. Therefore, in the case of using expanded graphite, the exfoliated graphite can be obtained more easily.

The number of laminated graphene layers in the graphite is about 100,000 layers or more to 1,000,000 layers, and the graphite has a specific surface area by BET (BET specific surface area) of less than 25 m²/g.

Meanwhile, the number of laminated graphene layers in the resin-remaining partially exfoliated graphite is small in the portions where the graphite is partially exfoliated. The number of laminated graphene layers is preferably 1,000 layers or less, more preferably 100 layers or less, further preferably 20 layers or less, in the exfoliated portions. When the number of laminated graphene layers is small in the exfoliated portions, the compatibility with the binder resin can be still further enhanced.

In the resin-remaining partially exfoliated graphite, the number of laminated graphene layers is small in the exfoliated portions in the edge parts, and therefore the partially exfoliated graphite has a larger specific surface area by BET (BET specific surface area) than the graphite. The BET specific surface area of the resin-remaining partially exfoliated graphite is preferably 25 m²/g or more and 500 m²/g or less. When the BET specific surface area falls within the aforementioned range, the separation of the active material from the current collector can be suppressed, while the amount of the binder resin added is still further reduced.

In the present invention, primary exfoliated graphite may be used as a raw material instead of the graphite. The primary exfoliated graphite contains a large amount of exfoliated graphite obtained by exfoliating graphite. In the case of using the primary exfoliated graphite as a raw material, a composition which contains the primary exfoliated graphite and a resin and in which the resin is grafted or adsorbed onto the primary exfoliated graphite is prepared. Since the primary exfoliated graphite is obtained by exfoliating graphite, the primary exfoliated graphite needs only to have a larger specific surface area than the graphite.

In this description, the exfoliated graphite means a graphene laminate after exfoliation which is obtained by exfoliating the original graphite or the primary exfoliated graphite and which has a larger specific surface area than the original graphite or the primary exfoliated graphite or has a decomposition end point of the original graphite or the primary exfoliated graphite shifts to lower temperature.

The resin grafted or fixed by adsorption onto the graphite or the primary exfoliated graphite is not specifically limited, but is preferably a polymer of radical polymerizable monomers. The resin may be a copolymer of a plurality of types of radical polymerizable monomers, or may be a homopolymer of a single type of radical polymerizable monomers.

Examples of the resin used include polypropylene glycol, polyglycidyl methacrylate, polyvinyl acetate, polybutyral, and polyacrylic acid. Preferably, polyglycidyl methacrylate is used. In the case of using polyglycidyl methacrylate, the specific surface area of the resin-remaining partially exfoliated graphite under wet conditions can be still further increased.

The amount of the resin remaining in the resin-remaining partially exfoliated graphite is preferably 5 parts by weight to 450 parts by weight with respect to 100 parts by weight of the partially exfoliated graphite. The amount of the remaining resin is more preferably 15 parts by weight to 350 parts by weight, further preferably 25 parts by weight to 300 parts by weight. When the amount of the remaining resin falls within the aforementioned range, the specific surface area of the resin-remaining partially exfoliated graphite in liquid can be still further increased.

The resin-remaining partially exfoliated graphite has a feature of being comparatively less likely to scatter. This is probably because the polymer (resin) formed by polymerization of the radical polymerizable monomers is not completely decomposed in the pyrolysis step and remains. In other words, the resin located in the portion interposed between graphene layers or exfoliated graphite layers in the resin-remaining partially exfoliated graphite is interposed between the graphene layers or the graphite layers on both sides and thus is not completely decomposed in the vicinity of the thermal decomposition temperature. Therefore, the handling of the resin-remaining partially exfoliated graphite is easy.

As described above, the resin-remaining partially exfoliated graphite has a graphite structure in the center part and an exfoliated structure in the edge parts. Therefore, the handling thereof is easier than in conventional exfoliated graphite.

The resin-remaining partially exfoliated graphite contains a resin and thus has high dispersibility in another resin. In particular, in the case where the other resin is a resin having high affinity to the resin contained in the resin-remaining partially exfoliated graphite, the dispersibility of the resin-remaining partially exfoliated graphite in the other resin is still further enhanced.

The resin-remaining partially exfoliated graphite can be produced by the same method as the method for producing an exfoliated graphite-resin composite material according to International Publication No. WO 2014/034156 A1. Since no oxidation step is included in the aforementioned production method, the resin-remaining partially exfoliated graphite has superior conductivity to conventional graphene oxide and graphene obtained by reducing the graphene oxide.

The conduction aid may further contain another conduction aid as a carbonaceous material. Examples of the other conduction aid can include Ketjen black, acetylene black, carbon nanotube, carbon nanofiber, and graphene.

The content of the carbonaceous material in the conduction aid is not specifically limited, but is preferably 10 wt % or more, more preferably 50 wt % or more, and preferably 100 wt % or less, in 100 wt % of the conduction aid. When the content of the conduction aid is the aforementioned lower limit or more and the aforementioned upper limit or less, the separation of the active material from the current collector can be still further suppressed.

Solvent for Conduction Aid-Active Material Adsorption:

In the present invention, a solvent for conduction aid-active material adsorption may be used for enhancing the adsorption properties between the active material and the conduction aid. As the solvent for adsorption, at least one selected from nonpolar solvents such as hexane, toluene, and ethyl acetate, polar aprotic solvents such as tetrahydrofuran (THF) and N,N-dimethylformamide, and polar protic solvents such as methanol and ethanol can be used. Preferably, tetrahydrofuran can be used. In the case of using tetrahydrofuran, the adsorption between the conduction aid and the active material is strong, and the electrode resistance when used for an electrode can be still further reduced.

Binder Resin:

As the binder resin, polybutyral, polytetrafluoroethylene, styrene butadiene rubber, polyimide resin, acrylic resin, fluorine-containing polymers such as polyvinylidene fluoride, water-soluble carboxymethylcellulose, or modified products of these can be used. These may be individually used, or a plurality of them may be used in combination. Preferably, polytetrafluoroethylene can be used. In the case of using polytetrafluoroethylene, the dispersibility and the heat resistance can be still further improved.

(Lithium Ion Secondary Battery)

The lithium ion secondary battery according to the present invention includes an electrode constituted by the carbonaceous material-active material complex or the electrode material for a lithium ion secondary battery. The carbonaceous material-active material complex or the electrode material for a lithium ion secondary battery may be used for either a positive electrode or a negative electrode but is preferably used for a positive electrode.

The positive electrode used for the lithium ion secondary battery of the present invention is, for example, produced as follows.

First, the active material and the conduction aid are dispersed in the solvent for conduction aid-active material adsorption, followed by stirring for a predetermined time, so that the active material and the conduction aid are adsorbed together in the solvent. Next, the solvent is removed, and the complex of the active material and the conduction aid is dried. Thereafter, the complex is calcined, as needed. The resin contained in the resin-remaining partially exfoliated graphite may be removed by the calcination. Thereby, a carbonaceous material-active material complex is obtained. Subsequently, the obtained complex is mixed with a binder resin to produce a coating liquid. Next, the coating liquid is appropriately diluted and thereafter is applied to a current collector such as a metal foil, followed by drying, to produce a positive electrode. The produced positive electrode may be punched as it is into the electrode shape for use, but is generally subjected to processing such as roll pressing for further improving the electrode density and thereafter is punched into the electrode shape for use.

In the present invention, a carbonaceous material having different specific surface areas between a wet state and a dry state is used as the conduction aid, as described above, and therefore the separation of the active material from the current collector is less likely to occur even when processing such as roll pressing is performed. Therefore, the amount of the binder resin added can be reduced, and thus the content of the active material is increased in the positive electrode formed using the electrode material for a lithium ion secondary battery according to the present invention. Accordingly, the lithium ion secondary battery of the present invention including the positive electrode has an increased capacity.

In the present invention, the carbonaceous material constituting the carbonaceous material-active material complex has a volume resistivity within the aforementioned specific range, and therefore when it is used as an electrode material for a lithium ion secondary battery, the initial charge and discharge efficiency and the cycle characteristics of the lithium ion secondary battery can be effectively enhanced. Accordingly, in the lithium ion secondary battery of the present invention including the positive electrode constituted by the carbonaceous material-active material complex, the initial charge and discharge efficiency and the cycle characteristics are effectively enhanced.

Next, the present invention will be clarified by way of specific examples and comparative examples of the present invention. The present invention is not limited to the following examples.

EXAMPLE 1

(Preparation of Resin-Remaining Partially Exfoliated Graphite)

In 450 g of tetrahydrofuran was dissolved 50 g of polyglycidyl methacrylate (product name "MARPROOF G-2050M" manufactured by NOF CORPORATION, with an average molecular weight of about 200,000 and a pyrolysis starting temperature of 245° C.), to obtain a 10 wt % solution of polyglycidyl methacrylate. To the polyglycidyl methacrylate solution, were added 2.5 g of expanded graphite (product name "PF powder 8F" manufactured by Toyo Tanso Co., Ltd.) and 5.0 g of a chemical foaming agent (product name "VINYFOR AC#R-K3" manufactured by EIWA CHEMICAL IND. CO., LTD.) to form a mixture.

Next, the mixture was irradiated with ultrasound using an ultrasonic treatment apparatus (manufactured by HONDA ELECTRONICS CO., LTD.) at 100 W and an oscillation frequency of 28 kHz for 300 minutes. Thereby, a composition in which the expanded graphite is dispersed in the polyglycidyl methacrylate solution was obtained. The composition was molded into a sheet with a thickness of 10 to 20 mm by casting. The obtained sheet was dried by heating at a temperature of 80° C. for 2 hours, a temperature of 110° C. for 1 hour, and a temperature of 150° C. for 1 hour.

After the drying, a heating step of decomposing the foaming agent by heating at a temperature of 230° C. for 2 hours and thereafter maintaining the temperature at 430° C. for 30 minutes was conducted. Thereby, the polyglycidyl methacrylate was partially pyrolyzed, to obtain a resin-remaining partially exfoliated graphite. In the resin-remaining partially exfoliated graphite, the polyglycidyl methacrylate partially remains.

The BET specific surface area x of the obtained resin-remaining partially exfoliated graphite was 292 m$^2$/g, and the amount y of methylene blue adsorbed thereof was 45.1 μmol/g. The ratio y/x was 0.154. The BET specific surface area and the amount of methylene blue adsorbed were measured by the later-described method.

After mixing 15 g of a THF solution containing 5 wt % in electrode weight of the resin-remaining partially exfoliated graphite as a conduction aid (carbonaceous material) obtained as above excluding the resin-remaining portion of the partially exfoliated graphite and 10 g of a THF solution containing 93 wt % in electrode weight of LiCoO$_2$ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a complex of the partially exfoliated graphite and LiCoO$_2$ as an active material. To the complex of the partially exfoliated graphite and the active material, was added 2 wt % of polyvinylidene fluoride (product name "PVDF #1100" manufactured by KISHIDA CHEMICAL Co., Ltd.) as a binder resin in electrode weight, followed by kneading in a mortar. After the kneading, NMP was appropriately added thereto to dilute the mixture to a viscosity which allows coating, to produce a coating liquid. The produced coating liquid was applied to a Cu foil as a current collector using an applicator set to 9 mil to produce an electrode sheet.

The thus obtained electrode sheet was dried under reduced pressure at 80° C. for 12 hours and subsequently dried under reduced pressure by raising the temperature to 110° C. for 2 hours. After the drying, a part of the electrode sheet was punched into a circular shape with a diameter of 14 mm to obtain a positive electrode for a lithium ion secondary battery before roll pressing.

The remaining electrode sheet was subjected to roll pressing under the condition of a temperature of 25° C. using an ultra small desktop roll press machine manufactured by Hohsen Corp., and thereafter punched into a circular shape with a diameter of 14 mm, to obtain a positive electrode for a lithium ion secondary battery after roll pressing.

EXAMPLE 2

Positive electrodes for a lithium ion secondary battery before and after roll pressing were obtained in the same manner as in Example 1 except that 15 q of a THF solution containing 5 wt % in electrode weight of a resin-remaining partially exfoliated graphite produced in the same manner as in Example 1 excluding the resin-remaining portion of the partially exfoliated graphite, 10 g of a THF solution containing 92 wt % in electrode weight of LiCoO$_2$ (product name "Lithium cobalt(III)oxide" manufactured by Sigma-Aldrich Co. LLC.) as an active material, and 3 wt % in electrode weight of polyvinylidene fluoride (product name "PVDF #1100" manufactured by KISHIDA CHEMICAL Co., Ltd.) as a binder resin were added.

EXAMPLE 3

(Preparation of Resin-Remaining Partially Exfoliated Graphite)

To prepare a raw material composition, 10 g of expanded graphite (product name "PF powder 8F" manufactured by Toyo Tanso Co., Ltd., with a BET surface area of 22 m$^2$/g), 20 g of ADCA (product name "VINYFOR AC#R-K3" manufactured by EIWA CHEMICAL IND. CO., LTD., with a thermal decomposition temperature of 210° C.) as a thermally decomposable foaming agent, 200 g of polypropylene glycol (SANNIX GP-3000, manufactured by Sanyo Chemical Industries, Ltd., with an average molecular weight of 3000), and 200 g of tetrahydrofuran as a solvent were mixed together. The raw material composition was irradiated with ultrasound using an ultrasonic treatment apparatus (manufactured by HONDA ELECTRONICS CO., LTD.) at 100 W and an oscillation frequency of 28 kHz for 5 hours. The polypropylene glycol (PPG) was adsorbed onto the expanded graphite by the ultrasonic treatment. Thus, a composition in which the polypropylene glycol is adsorbed onto the expanded graphite was prepared.

After the ultrasonic irradiation, the composition was molded by the solution casting method and was dried by heating at a drying temperature of 80° C. for 2 hours, at 110° C. for 1 hour, and at 150° C. for 1 hour. Thereafter, the composition was maintained at 110° C. for 1 hour and was further maintained at 230° C. for 2 hours. Thereby, the ADCA was pyrolyzed and foamed in the composition.

Next, a heating step of maintaining the temperature at 450° C. for 0.5 hour was conducted. Thereby, the polypropylene glycol was partially pyrolyzed to obtain a resin-remaining partially exfoliated graphite. The polypropylene glycol partially remains in the resin-remaining partially exfoliated graphite.

The BET specific surface area x of the obtained resin-remaining partially exfoliated graphite was 150 m²/g, and the amount y of methylene blue adsorbed thereof was 67.0 μmol/g. The ratio y/x was 0.447. The BET specific surface area and the amount of methylene blue adsorbed were measured by the later-described method.

Positive electrodes for a lithium ion secondary battery before and after roll pressing were obtained in the same manner as in Example 2 except that the thus obtained resin-remaining partially exfoliated graphite was used, and the calcination conditions were changed to 350° C. for 2 hours.

COMPARATIVE EXAMPLE 1

Ketjen black (product name "EC300J" manufactured by Lion Corporation) was used as a conduction aid (carbonaceous material) instead of the resin-remaining partially exfoliated graphite. Since no resin remains in Ketjen black, the calcination when forming the conduction aid-active material complex was not performed. Except for these, positive electrodes for a lithium ion secondary battery before and after roll pressing were obtained in the same manner as in Example 1. In the positive electrodes, the contents of the active material, the conduction aid, and the binder resin were respectively 93 wt %, 5 wt %, and 2 wt %, sequentially. The BET specific surface area x of Ketjen black was 800 m²/g, and the amount y of methylene blue adsorbed thereof was 98.96 μmol/g. The ratio y/x was 0.124. The BET specific surface area and the amount of methylene blue adsorbed were measured by the later-described method. The electrode density before roll pressing was 1.95 g/cm³, and the electrode density after roll pressing was 2.71 g/cm³.

COMPARATIVE EXAMPLE 2

Positive electrodes for a lithium ion secondary battery before and after roll pressing were obtained in the same manner as in Comparative Example 1 except that the contents of the active material, the conduction aid, and the binder resin in the positive electrodes were set respectively to 92 wt %, 5 wt %, and 3 wt %, sequentially. The electrode density before roll pressing was 2.28 g/cm³, and the electrode density after roll pressing was 2.98 g/cm³.

As shown in FIG. 1, in the positive electrode of Example 1, the active material was not separated from the current collector after roll pressing. Likewise, in the positive electrodes of Examples 2 and 3, the active material was not separated from the current collector after roll pressing.

In contrast, as shown in FIG. 2, in the positive electrode of Comparative Example 1, the active material was separated from the current collector after roll pressing. As shown in FIG. 3, in the positive electrode of Comparative Example 2, the active material was partially separated from the current collector after roll pressing.

(Evaluation Method)

In Examples and Comparative Examples, the BET specific surface area, the amount of methylene blue adsorbed, and the electrode density were measured as follows.

BET Specific Surface Area:

The BET specific surface area was measured by a specific surface area analyzer (product number "ASAP-2000" manufactured by SHIMADZU CORPORATION) using nitrogen gas.

Amount of Methylene Blue Adsorbed:

In volumetric flasks, methanol solutions of methylene blue at concentrations of 10 mg/L, 5.0 mg/L, 2.5 mg/L, and 1.25 mg/L were prepared. As the methylene blue, methylene blue of a special grade reagent manufactured by KANTO CHEMICAL CO., INC. was used. The absorbance of the four types of methylene blue solutions prepared above was measured using an ultraviolet visible spectrophotometer (product number UV-1600) manufactured by SHIMADZU CORPORATION, and a standard curve was plotted.

Next, 0.005 g of methylene blue was placed in a 50 mL volumetric flask, and methanol as a solvent for measurement was added thereto, to prepare a 100 mg/L methylene blue solution. The methylene blue solution was diluted 10-fold using the solvent for measurement, to obtain a 10 mg/L methylene blue solution.

To a 100 mL eggplant flask, were added a stirrer bar, a carbonaceous material (0.005 to 0.05 g, which varies depending on the BET value of the sample) as a measurement target, and 50 mL of the 10 mg/L methylene blue solution, followed by ultrasonic treatment using an ultrasonic cleaner for 15 minutes. In this way, the carbonaceous material was dispersed, followed by stirring in a cooling bath at a temperature of 25° C. for 60 minutes.

After adsorption equilibrium was reached, the carbonaceous material was separated from the supernatant by centrifugation. Using the ultraviolet visible spectrophotometer, the absorbance of the 10 mg/L methylene blue solution as a blank and the absorbance of the supernatant were measured.

The difference between the absorbance of the blank methylene blue solution and the absorbance of the supernatant, that is, the decrease in absorbance was calculated. The decrease in concentration of the methylene blue solution was determined from the decrease in absorbance and the slope of the standard curve. From the decrease in concentration of the methylene blue solution, the amount of methylene blue adsorbed onto the surface of the carbonaceous material was determined by the following formula.

Amount adsorbed (mol/g)={Decrease in concentration of methylene blue solution (g/L)×Volume of solvent for measurement (L)}/{Molecular weight of methylene blue (g/mol)×Mass of introduced carbonaceous material sample (g)}

Electrode Density:

The electrode density was determined by the following formula. Table 1 below shows the results.

Electrode density (g/cm³)=Electrode weight excluding weight of current collector and binder resin (g)/Electrode volume excluding volume of current collector (cm³)

Table 1 below shows the detailed results of Examples 1 to 3 and Comparative Examples 1 and 2.

TABLE 1

|  |  | Example 1 | Example 2 | Example 3 | Comp. Example 1 | Comp. Example 2 |
|---|---|---|---|---|---|---|
| Active material (wt %) | LiCoO₂ | 93 | 92 | 92 | 93 | 92 |
| Conduction aid (wt %) | Partially exfoliated graphite (remaining resin: content excluding polyglycidyl methacrylate) | 5 | 5 |  |  |  |

TABLE 1-continued

|  |  | Example 1 | Example 2 | Example 3 | Comp. Example 1 | Comp. Example 2 |
|---|---|---|---|---|---|---|
|  | Partially exfoliated graphite (remaining resin: content excluding polypropylene glycol) |  |  | 5 |  |  |
|  | Ketjen black |  |  |  | 5 | 5 |
|  | VGCF-H |  |  |  |  |  |
| Binder resin (wt %) | Polyvinylidene fluoride | 2 | 3 | 3 | 2 | 3 |
| Electrode density after roll pressing (g/cm³) |  | 3.30 | 2.86 | 3.06 | 2.71 | 2.98 |
| Separation between current collector and active material after roll pressing |  | None (FIG. 1) | None | None | Separated (FIG. 2) | Partially separated (FIG. 3) |

EXAMPLE 4

In 450 g of tetrahydrofuran was dissolved 50 g of polyglycidyl methacrylate (product name "MARPROOF G-2050M" manufactured by NOF CORPORATION, with an average molecular weight of about 200,000 and a pyrolysis starting temperature of 245° C.), to obtain a 10 wt % solution of polyglycidyl methacrylate. To the polyglycidyl methacrylate solution, were added 2.5 g of expanded graphite (product name "PF powder 8F" manufactured by Toyo Tanso Co., Ltd.) and 5.0 g of a chemical foaming agent (product name "VINYFOR AC#R-K3" manufactured by EIWA CHEMICAL IND. CO., LTD.) to form a mixture.

Next, the mixture was irradiated with ultrasound using an ultrasonic treatment apparatus (manufactured by HONDA ELECTRONICS CO., LTD.) at 100 W and an oscillation frequency of 28 kHz for 300 minutes. Thereby, a composition in which the expanded graphite is dispersed in the polyglycidyl methacrylate solution was obtained. The composition was molded into a sheet with a thickness of 10 to 20 mm by casting. The obtained sheet was dried by heating at a temperature of 80° C. for 2 hours, a temperature of 110° C. for 1 hour, and a temperature of 150° C. for 1 hour.

After the drying, a heating step of decomposing the foaming agent by heating at a temperature of 230° C. for 2 hours and thereafter maintaining the temperature at 430° C. for 30 minutes was conducted. Thereby, the polyglycidyl methacrylate was partially pyrolyzed, to obtain a resin-remaining partially exfoliated graphite. In the resin-remaining partially exfoliated graphite, the polyglycidyl methacrylate partially remains.

The BET specific surface area x of the obtained resin-remaining partially exfoliated graphite was 292 m²/g, and the amount y of methylene blue adsorbed thereof was 45.1 µmol/g. The ratio y/x was 0.154. The BET specific surface area and the amount of methylene blue adsorbed were measured by the aforementioned method.

After mixing 15 g of a THF solution containing 5 wt % in the entire complex of the resin-remaining partially exfoliated graphite obtained as above excluding the resin-remaining portion of the partially exfoliated graphite and 10 g of a THF solution containing 95 wt % in the entire complex of LiCoO₂ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a carbonaceous material-active material complex that is a complex of the partially exfoliated graphite having the composition shown in Table 2 below and LiCoO₂ as an active material.

EXAMPLE 5

To prepare a raw material composition, 10 g of expanded graphite (product name "PF powder 8F" manufactured by Toyo Tanso Co., Ltd., with a BET surface area of 22 m²/g), 20 g of ADCA (product name "VINYFOR AC#R-K3" manufactured by EIWA CHEMICAL IND. CO., LTD., with a thermal decomposition temperature of 210° C.) as a thermally decomposable foaming agent, 200 g of polypropylene glycol (SANNIX GP-3000, manufactured by Sanyo Chemical Industries, Ltd., with an average molecular weight of 3000), and 200 g of tetrahydrofuran as a solvent were mixed together. The raw material composition was irradiated with ultrasound using an ultrasonic treatment apparatus (manufactured by HONDA ELECTRONICS CO., LTD.) at 100 W and an oscillation frequency of 28 kHz for 5 hours. The polypropylene glycol (PPG) was adsorbed onto the expanded graphite by the ultrasonic treatment. Thus, a composition in which the polypropylene glycol is adsorbed onto the expanded graphite was prepared.

After the ultrasonic irradiation, the composition was molded by the solution casting method and was dried by heating at a drying temperature of 80° C. for 2 hours, at 110° C. for 1 hour, and at 150° C. for 1 hour. Thereafter, the composition was maintained at 110° C. for 1 hour and was further maintained at 230° C. for 2 hours. Thereby, the ADCA was pyrolyzed and foamed in the composition.

Next, a heating step of maintaining the temperature at 450° C. for 0.5 hour was conducted. Thereby, the polypropylene glycol was partially pyrolyzed, to obtain a resin-remaining partially exfoliated graphite. The polypropylene glycol partially remains in the resin-remaining partially exfoliated graphite.

The BET specific surface area x of the obtained resin-remaining partially exfoliated graphite was 150 m²/g, and the amount y of methylene blue adsorbed thereof was 67.0 µmol/g. The ratio y/x was 0.447. The BET specific surface area and the amount of methylene blue adsorbed were measured by the aforementioned method.

After mixing 15 g of a THF solution containing 5 wt % in the entire complex of the resin-remaining partially exfoliated graphite obtained as above excluding the resin-remaining portion of the partially exfoliated graphite and 10 g of a THF solution containing 95 wt % in the entire complex of LiCoO₂ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 350° C. for 2 hours, and the resin-remaining portion contained in the resin-remaining partially exfoliated graphite was removed, to obtain a carbonaceous material-active material complex that is a complex of the partially exfoliated graphite having the composition shown in Table 2 below and LiCoO₂ as an active material.

COMPARATIVE EXAMPLE 3

Ketjen black (product name "EC300J" manufactured by Lion Corporation) was used instead of the resin-remaining partially exfoliated graphite. Since no resin remains in Ketjen black, the calcination when forming the carbonaceous material-active material complex was not performed. Except for these, a carbonaceous material-active material complex having the composition shown in Table 2 below was obtained in the same manner as in Example 4.

COMPARATIVE EXAMPLE 4

A mixture of 80 wt % of Ketjen black (product name "EC300J" manufactured by Lion Corporation) as a conduction aid and 20 wt % of fibrous carbon (product name "VGCF-H" manufactured by Showa Denko K.K.) was used instead of the resin-remaining partially exfoliated graphite. Since no resin remains in the mixture, the calcination when forming the carbonaceous material-active material complex was not performed. Except for these, a carbonaceous material-active material complex having the composition shown in Table 2 below was obtained in the same manner as in Example 4.

FIG. 5 is a graph showing the volume resistivity at each pressure of carbonaceous material-active material complexes obtained in Examples and Comparative Examples. Likewise, Table 2 below shows the volume resistivity at each pressure of the carbonaceous material-active material complexes obtained in Examples and Comparative Examples. In FIG. 5, the letter A indicates the results of Example 4, the letter B indicates the results of Example 5, the letter C indicates the results of Comparative Example 3, the letter D indicates the results of Comparative Example 4, and the letter E indicates the results of $LiCoO_2$ alone for comparison.

four-probe method using a powder resistivity meter (product number: PD-51, manufactured by Mitsubishi Chemical Corporation).

EXAMPLE 6

After mixing 15 g of a THF solution containing 5 wt % in electrode weight of a resin-remaining partially exfoliated graphite obtained in the same manner as in Example 4 excluding the resin-remaining portion of the partially exfoliated graphite and 10 g of a THF solution containing 92 wt % in electrode weight of $LiCoO_2$ (product name "Lithium cobalt(III)oxide" manufactured by Sigma-Aldrich Co. LLC.) as the active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a complex of the partially exfoliated graphite and $LiCoO_2$ as an active material. To the complex of the partially exfoliated graphite and the active material, was added 3 wt % in electrode weight of polyvinylidene fluoride (product name "PVDF #1100" manufactured by KISHIDA CHEMICAL Co., Ltd.) as a binder resin, followed by kneading in a mortar. After the kneading, NMP was appropriately added thereto to dilute the mixture to a viscosity which allows coating, to produce a coating liquid. The produced coating liquid was applied to a Cu foil as a current collector using an applicator set to 9 mil to produce an electrode sheet having an electrode layer on the current collector.

The thus obtained electrode sheet was dried under reduced pressure at 80° C. for 12 hours and subsequently dried under reduced pressure by raising the temperature to 110° C. for 2 hours. After the drying, the electrode sheet was subjected to roll pressing under the condition of a temperature of 25° C. using an ultra small desktop roll press machine manufactured by Hohsen Corp. The volume resistivity of the electrode sheet after roll pressing was measured. FIG. 6 shows the results. Separately, the electrode sheet was punched into a circular shape so as to have a diameter after roll pressing of 14 mm, to obtain a positive electrode for a lithium ion secondary battery.

TABLE 2

|  |  | Example 4 | Example 5 | Comp. Example 3 | Comp. Example 4 |
|---|---|---|---|---|---|
| Active material (wt %) | $LiCoO_2$ | 95 | 95 | 95 | 95 |
| Conduction aid (wt %) | Partially exfoliated graphite (remaining resin: content excluding polyglycidyl methacrylate) | 5 |  |  |  |
|  | Partially exfoliated graphite (remaining resin: content excluding polypropylene glycol) |  | 5 |  |  |
|  | Ketjen black |  |  | 5 | 4 |
|  | VGCF-H |  |  |  | 1 |
| Volume resistivity ($\Omega \cdot cm$) | Pressure: 13 MPa | 0.2433 | 0.0550 | 1.4830 | 0.7907 |
|  | Pressure: 25 MPa | 0.1911 | 0.0489 | 1.0470 | 0.5525 |
|  | Pressure: 38 MPa | 0.1638 | 0.0452 | 0.8269 | 0.4419 |
|  | Pressure: 51 MPa | 0.1454 | 0.0428 | 0.6903 | 0.3722 |
|  | Pressure: 64 MPa | 0.1322 | 0.0407 | 0.5910 | 0.3247 |

As shown in FIG. 5 and Table 2, the volume resistivity was reduced in Examples 4 and 5 as compared with the results of Comparative Examples 3 and 4, and $LiCoO_2$ regardless of the pressure.

It is seen from FIG. 5 and Table 2 that the volume resistivity at a pressure of 13 MPa was 0.7 Ω·cm or less in Examples 4 and 5. In particular, the volume resistivity was 0.1 Ω·cm or less in Example 5. It is seen that the volume resistivity at a pressure of 38 MPa was 0.2 Ω·cm or less in Examples 4 and 5. In particular, the volume resistivity was 0.1 Ω·cm or less in Example 5.

The volume resistivity was obtained by measuring the electric resistance at a predetermined pressure value by the

EXAMPLE 7

A positive electrode for a lithium ion secondary battery was obtained in the same manner as in Example 6 except that a resin-remaining partially exfoliated graphite produced by the same method as in Example 5 was used.

COMPARATIVE EXAMPLE 5

Ketjen black (product name "EC300J" manufactured by Lion Corporation) was used instead of the resin-remaining partially exfoliated graphite. Since no resin remains in Ketjen black, the calcination when forming the carbonaceous material-active material complex was not performed. Except for these, a positive electrode for a lithium ion secondary battery was obtained in the same manner as in Example 6.

COMPARATIVE EXAMPLE 6

A mixture of 80 wt % of Ketjen black (product name "EC300J" manufactured by Lion Corporation) and 20 wt % of fibrous carbon (product name "VGCF-H" manufactured by Showa Denko K.K.) was used instead of the resin-remaining partially exfoliated graphite. Since no resin remains in the mixture, the calcination when forming the carbonaceous material-active material complex was not performed. The composition of the carbonaceous material-active material complex is as shown in Table 3 below. Except for these, a positive electrode for a lithium ion secondary battery was obtained in the same manner as in Example 6.

FIG. 6 is a graph showing the volume resistivity of electrode sheets after roll pressing obtained in Examples 6 and 7 and Comparative Examples 5 and 6. Likewise, Table 3 below shows the volume resistivity of the electrode sheets after roll pressing obtained in Examples 6 and 7 and Comparative Examples 5 and 6. The volume resistivity of the electrode sheets was measured using an electrode resistivity meter (manufactured by HIOKI E.E. CORPORATION). Specifically, as shown in FIG. 7, a constant current was allowed to flow on the surface of an electrode layer 4, and the potential on the surface of the electrode layer 4 was measured at many points, thereby measuring the volume resistivity of the electrode layer 4 and the resistivity at the interface between the electrode layer 4 and a current collector 5. The electrode density after roll pressing in Table 3 was measured by the aforementioned method.

ion secondary battery was produced using the positive electrode in a glove box sprayed with an argon gas.

FIG. 8 schematically shows the structure of the experimental lithium ion secondary battery as an exploded perspective view.

As shown in FIG. 8, a negative electrode 8, a separator 9, an electrode guide 10, a positive electrode 11 obtained as above, an electrode holder 12, and a spring 13 were laminated sequentially from the negative electrode body 6 side between a negative electrode body 6 and a positive electrode body 7. A lithium metal piece with a diameter of 16 mm was used as the negative electrode 8. A resin film (product name: ESFINO) manufactured by SEKISUI CHEMICAL CO., LTD. was used as the separator 9. A 1-mol/L LiBF4 (EC: DEC=1:1 v/v %) electrolyte manufactured by KISHIDA CHEMICAL Co., Ltd. was used as an electrolyte.

The experimental lithium ion secondary battery assembled as described above was charged at a charge rate of 0.05 C from a voltage of 3.1 V to 4.25 V. After the voltage was maintained for 2 hours from when 4.25 V was reached, a pause for 1 minute was made. Next, the battery was discharged at a discharge rate of 0.05 C from 4.25 V to 3.1 V. After the discharge, a pause for 1 minute was made.

A cycle composed of the aforementioned charge and discharge was repeated 5 times. Next, one cycle of the charge and discharge was performed by changing the charge and discharge rate to 0.1 C. Next, one cycle of the charge and discharge was performed by changing the charge and discharge rate to 0.2 C. Subsequently, the cycle composed of the charge and discharge was repeated 13 times by changing the charge and discharge rate to 0.5 C. FIG. 9 shows the results of the charge-discharge test. In FIG. 9, the horizontal axis represents the number of charge and discharge cycles, and the vertical axis represents the capacity per gram of the positive electrode active material (mAhg$^{-1}$), that is, the charge and discharge characteristics. In the figure, the solid line represents the charge characteristics, and the dashed line represents the discharge characteristics.

As shown in FIG. 9, it was able to be confirmed that the initial charge and discharge efficiency and the cycle char-

TABLE 3

|  |  | Example 6 | Example 7 | Comp. Example 5 | Comp. Example 6 |
|---|---|---|---|---|---|
| Active material (wt %) | LiCoO$_2$ | 92 | 92 | 92 | 92 |
| Conduction aid (wt %) | Partially exfoliated graphite (remaining resin: content excluding polyglycidyl methacrylate) | 5 |  |  |  |
|  | Partially exfoliated graphite (remaining resin: content excluding polypropylene glycol) |  | 5 |  |  |
|  | Ketjen black |  |  | 5 | 4 |
|  | VGCF-H |  |  |  | 1 |
| Binder resin (wt %) | Polyvinylidene fluoride | 3 | 3 | 3 | 3 |
|  | Electrode density after roll pressing (g/cm$^3$) | 2.86 | 3.06 | 2.98 | — |
|  | Volume resistivity of electrode sheet after roll pressing (Ω · cm) | 1.46 | 1.01 | 7.28 | 4.15 |

As shown in FIG. 6 and Table 3, it was able to be confirmed that the volume resistivity of the electrode layer 4 was reduced in Examples 6 and 7 as compared with that in Comparative Examples 5 and 6.

Next, using the sheet-like positive electrode for a lithium ion secondary battery obtained in Example 6 and Comparative Examples 5 and 6, an experimental lithium ion secondary battery was produced as follows, and the charge and discharge characteristics were evaluated.

The positive electrode for a lithium ion secondary battery was placed under vacuum and was dried under the condition of 110° C. for 4 hours. After drying, the experimental lithium acteristics of the lithium ion secondary battery were enhanced in Example 6 as compared with those in Comparative Examples 5 and 6.

EXAMPLE 8

After mixing 15 g of a THF solution containing 3 wt % in electrode weight of a resin-remaining partially exfoliated graphite produced in the same manner as in Example 1 excluding the resin-remaining portion of the partially exfoliated graphite and 10 g of a THF solution containing 97 wt % in electrode weight of LiCoO$_2$ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a complex of the partially exfoliated graphite and LiCoO$_2$ as an active material.

EXAMPLE 9

After mixing 15 g of a THF solution containing 2 wt % in electrode weight of a resin-remaining partially exfoliated graphite produced in the same manner as in Example 1 excluding the resin-remaining portion of the partially exfoliated graphite and 10 g of a THF solution containing 98 wt % in electrode weight of LiCoO$_2$ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a complex of the partially exfoliated graphite and LiCoO$_2$ as an active material.

EXAMPLE 10

After mixing 15 g of a THF solution containing 1 wt % in electrode weight of a resin-remaining partially exfoliated graphite produced in the same manner as in Example 1 excluding the resin-remaining portion of the partially exfoliated graphite and 10 g of a THF solution containing 99 wt % in electrode weight of LiCoO$_2$ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a complex of the partially exfoliated graphite and LiCoO$_2$ as an active material.

COMPARATIVE EXAMPLE 7

Acetylene black (product name "Li400" manufactured by DENKI KAGAKU KOGYO KABUSHIKI KAISHA) was used as a conduction aid (carbonaceous material) instead of the resin-remaining partially exfoliated graphite. Since no resin remains in acetylene black, the calcination when forming the conduction aid-active material complex was not performed. Except for these, a conduction aid-active material complex for a lithium ion secondary battery was obtained in the same manner as in Example 4. In the complex, the contents of the active material and the conduction aid were respectively 95 wt % and 5 wt %.

COMPARATIVE EXAMPLE 8

Acetylene black (product name "Li400" manufactured by DENKI KAGAKU KOGYO KABUSHIKI KAISHA) was used as a conduction aid (carbonaceous material) instead of the resin-remaining partially exfoliated graphite. Since no resin remains in acetylene black, the calcination when forming the conduction aid-active material complex was not performed. Except for these, a conduction aid-active material complex for a lithium ion secondary battery was obtained in the same manner as in Example 8. In the complex, the contents of the active material and the conduction aid were respectively 97 wt % and 3 wt %.

COMPARATIVE EXAMPLE 9

Acetylene black (product name "Li400" manufactured by DENKI KAGAKU KOGYO KABUSHIKI KAISHA) was used as a conduction aid (carbonaceous material) instead of the resin-remaining partially exfoliated graphite. Since no resin remains in acetylene black, the calcination when forming the conduction aid-active material complex was not performed. Except for these, a conduction aid-active material complex for a lithium ion secondary battery was obtained in the same manner as in Example 10. In the complex, the contents of the active material and the conduction aid were respectively 99 wt % and 1 wt %.

Table 4 shows the volume resistivity at a pressure of 38 MPa of the conduction aid-active material complexes in Examples 8 to 10 and Comparative Examples 7 to 9.

TABLE 4

| | | Example 8 | Example 9 | Example 10 | Comp. Example 7 | Comp. Example 8 | Comp. Example 9 |
|---|---|---|---|---|---|---|---|
| Active material (wt %) | LiCoO$_2$ | 97 | 98 | 99 | 95 | 97 | 99 |
| Conduction aid (wt %) | Partially exfoliated graphite (remaining resin: content excluding polyglycidyl methacrylate) | 3 | 2 | 1 | — | — | — |
| | Acetylene black | — | — | — | 5 | 3 | 1 |
| Volume resistivity ($\Omega \cdot$ cm) | Pressure 38 MPa | 0.03736 | 0.08456 | 5.36943 | 0.64397 | 4.89412 | 807.34241 |

EXAMPLE 11

After mixing 15 g of a THF solution containing 5 wt % in electrode weight of a resin-remaining partially exfoliated graphite produced in the same manner as in Example 1 excluding the resin-remaining portion of the partially exfoliated graphite and 10 g of a THE solution containing 92 wt % in electrode weight of LiCoO$_2$ (product name "Lithium cobalt(III)oxide" manufactured by Sigma-Aldrich Co. LLC.) as an active material, followed by stirring at room temperature for 1 hour, removal of THF by filtration, and drying in an oven at 50° C. for 2 hours. Next, the mixture was calcined at 380° C. for 2 hours, and the resin-remaining portion contained in the resin-remaining partially exfoliated graphite was removed, to obtain a complex of the partially exfoliated graphite and LiCoO$_2$ as an active material. A positive electrode (positive electrode sheet) for a lithium ion secondary battery was obtained in the same manner as in Example 1 by performing roll pressing to a thickness of the positive electrode sheet of 60 μm, 90 μm, and 120 μm (including 20 μm of the aluminum foil of the current collector foil) except that 3 wt % in electrode weight of polyvinylidene fluoride (product name "PVDF #1100" manufactured by KISHIDA CHEMICAL Co., Ltd.) as the binder resin was added to the complex of the partially exfoliated graphite and the active material.

COMPARATIVE EXAMPLE 10

Acetylene black (product name "Li400" manufactured by DENKI KAGAKU KOGYO KABUSHIKI KAISHA) was used as a conduction aid (carbonaceous material) instead of the resin-remaining partially exfoliated graphite. Since no resin remains in acetylene black, the calcination when forming the conduction aid-active material complex was not performed. In the positive electrodes, the contents of the active material, the conduction aid, and the binder resin (polyvinylidene fluoride) were respectively 92 wt %, 5 wt %, and 3 wt %, sequentially. Except for this, a positive electrode (positive electrode sheet) for a lithium ion secondary battery was obtained in the same manner as in Example 1 by performing roll pressing to a thickness of the positive electrode sheet of 60 μm, 90 μm, and 120 μm (including 20 μm of the aluminum foil of the current collector foil).

FIG. 10 is a relationship graph showing the thickness of the positive electrode sheets of Example 11 and Comparative Example 10 on the horizontal axis and the volume resistivity of the positive electrode sheets on the vertical axis. As shown in FIG. 10, it was able to be confirmed that the increase of the volume resistance following the increase of the thickness was suppressed in Example 11.

When the thickness of the positive electrode sheet is referred to as x and the volume resistivity of the positive electrode sheet is referred to as y Ω·cm, the curve obtained in Example 11 was $y=0.0355e^{0.0149x}$ $(x≥60)$. Meanwhile, the curve obtained in Comparative Example 10 was $y=0.1055e^{0.0169x}$ $(x≥60)$. An intermediate curve between Example 11 and Comparative Example 10 was $y=0.0786e^{0.0153x}$ $(x≥60)$, as shown in FIG. 10.

Accordingly, for still further enhancing the volume resistivity, it is preferable to satisfy $y<0.1055e^{0.0169x}$ $(x≥60)$, it is more preferable to satisfy $y≤0.0786e^{0.0153x}$ $(x≥60)$, and it is further preferable to satisfy $y≤0.0355e^{0.0149x}$, also in the case where the thickness is large.

REFERENCE SIGNS LIST

1 . . . Case
2 . . . Sample
3 . . . Electrode
4 . . . Electrode layer
5 . . . Current collector
6 . . . Negative electrode body
7 . . . Positive electrode body
8 . . . Negative electrode
9 . . . Separator
10 . . . Electrode guide
11 . . . Positive electrode
12 . . . Electrode holder
13 . . . Spring

The invention claimed is:

1. A carbonaceous material used as an electrode material for a lithium ion secondary battery, having a volume resistivity of 0.7 Ω·cm or less as measured at a pressure of 13 MPa in the form of a mixture of 5 wt % of the carbonaceous material and 95 wt % of lithium cobaltate,
wherein the carbonaceous material has a graphene-layered structure and an exfoliated plate shape.

2. The carbonaceous material according to claim 1, having a volume resistivity of 0.5 Ω·cm or less as measured at a pressure of 13 MPa in the form of a mixture of 5 wt % of the carbonaceous material and 95 wt % of lithium cobaltate.

3. The carbonaceous material according to claim 1, having a volume resistivity of 0.4 Ω·cm or less as measured at a pressure of 38 MPa in the foifu of a mixture of 5 wt % of the carbonaceous material and 95 wt % of lithium cobaltate.

4. The carbonaceous material according to claim 1, having a volume resistivity of 0.04 Ω·cm or less as measured at a pressure of 38 MPa in the form of a mixture of 3 wt % of the carbonaceous material and 97 wt % of lithium cobaltate.

5. The carbonaceous material according to claim 1, having a volume resistivity of 0.1 Ω·cm or less as measured at a pressure of 38 MPa in the form of a mixture of 2 wt % of the carbonaceous material and 98 wt % of lithium cobaltate.

6. The carbonaceous material according to claim 1, having a volume resistivity of 5.5 Ω·cm or less as measured at a pressure of 38 MPa in the form of a mixture of 1 wt % of the carbonaceous material and 99 wt % of lithium cobaltate.

7. The carbonaceous material according to claim 1, having a D/G ratio of 0.5 or less when a peak intensity ratio between a D band and a G band is referred to as the D/G ratio in a Raman spectrum obtained by Raman spectroscopy.

8. The carbonaceous material according to claim 1, satisfying $y<0.1055e^{0.0169x}(x≥60)$ when a thickness of a sheet consisting of 5 wt % of the carbonaceous material, 92 wt % of lithium cobaltate, and 3 wt % of polyvinylidene fluoride is referred to as x μm, and a volume resistivity of the sheet is referred to as y Ωcm.

9. The carbonaceous material according to claim 1, having a BET specific surface area ($m^2/g$) of 25 $m^2/g$ or more and 500 $m^2/g$ or less.

10. The carbonaceous material according to claim 1, the carbonaceous material being obtained by pyrolysis of a resin in a composition in which the resin is grafted or fixed by adsorption onto graphite or primary exfoliated graphite, and having a structure in which the graphite is partially exfoliated.

11. A carbonaceous material-active material complex comprising:
the carbonaceous material according to claim 1; and
an active material.

12. The carbonaceous material-active material complex according to claim 11, wherein
the active material is lithium cobaltate.

13. The carbonaceous material-active material complex according to claim 11, wherein
a content of the carbonaceous material is 0.5 wt % or more and 10 wt % or less.

14. The carbonaceous material-active material complex according to claim 11, being a positive electrode material fora lithium ion secondary battery.

15. A lithium ion secondary battery comprising:
an electrode constituted by the carbonaceous material-active material complex according to claim 11.

16. An electrode material for a lithium ion secondary battery, comprising:
an active material;
a conduction aid containing the carbonaceous material according to claim 1; and
a binder resin, wherein a percentage of the conduction aid in 100 wt % of the electrode material is 1 wt % or more and 10 wt % or less, a percentage of the binder resin in 100 wt % of the electrode material is 1 wt % or more and 4 wt % or less, and when an amount of methylene blue adsorbed per gram of the carbonaceous material (pmol/g) is referred to y, the amount of methylene blue adsorbed being measured based on a difference between an absorbance of a methanol solution of methylene blue at a concentration of 10 mg/L and an absorbance of a supernatant obtained by placing the carbonaceous material in the methanol solution of methylene blue, followed by centrifugation, and a BET specific surface area ($m^2$/g) of the carbonaceous material is referred to as x, a ratio y/x is 0.14 or more, and the BET specific surface area of the carbonaceous material is 25 $m^2$/g or more and 500 $m^2$/g or less.

17. The electrode material for a lithium ion secondary battery according to claim 16, the carbonaceous material being obtained by pyrolysis of a resin in a composition in which the resin is grafted or fixed by adsorption onto graphite or primary exfoliated graphite, having a structure in which the graphite is partially exfoliated, and being a resin-remaining partially exfoliated graphite in which the resin partially remains.

18. The electrode material for a lithium ion secondary battery according to claim 16, wherein an electrode density is 0.8 times or more and 1.5 times or less with respect to a specific gravity of the active material.

19. The electrode material for a lithium ion secondary battery according to claim 16, wherein the active material is lithium cobaltate.

20. The electrode material for a lithium ion secondary battery according to claim 16, wherein the binder resin comprises at least one selected from the group consisting of styrene butadiene rubber, carboxymethylcellulose, polyvinylidene fluoride, polyimide resin, acrylic resin, butyral resin, and modified products thereof.

21. The electrode material for a lithium ion secondary battery according to claim 16, being a positive electrode material for a lithium ion secondary battery.

22. A lithium ion secondary battery comprising:

an electrode constituted by the electrode material for a lithium ion secondary battery according to claim 16.

* * * * *

UNITED STATES PATENT AND TRADEMARK OFFICE
CERTIFICATE OF CORRECTION

PATENT NO. : 10,644,318 B2
APPLICATION NO. : 15/556993
DATED : May 5, 2020
INVENTOR(S) : Takuya Wada et al.

Page 1 of 1

It is certified that error appears in the above-identified patent and that said Letters Patent is hereby corrected as shown below:

On the Title Page

Item (73) Assignee: "SEKESUI" should be changed to --SEKISUI--.

In the Claims

Claim 3, Column 28, Line 11, the term "foifu" should be changed to --form--.

Claim 16, Column 29, Line 8, the unit of measurement "(pmol/g)" should be changed to --(μmol/g)--.

Signed and Sealed this
Tenth Day of November, 2020

Andrei Iancu
*Director of the United States Patent and Trademark Office*